United States Patent
Garg et al.

(10) Patent No.: US 8,289,541 B2
(45) Date of Patent: Oct. 16, 2012

(54) DOCUMENT HANDLING

(75) Inventors: Ken Garg, Brewster, NY (US); Fred Pulzello, Glen Rock, NJ (US); Mark Chambers, Forest Hills, NY (US); Debra Logan-Rabb, Stamford, CT (US)

(73) Assignee: Morgan Stanley, New York, NY (US)

( * ) Notice: Subject to any disclaimer, the term of this patent is extended or adjusted under 35 U.S.C. 154(b) by 1184 days.

(21) Appl. No.: 11/854,303

(22) Filed: Sep. 12, 2007

(65) Prior Publication Data

US 2008/0062472 A1 Mar. 13, 2008

Related U.S. Application Data

(60) Provisional application No. 60/825,367, filed on Sep. 12, 2006.

(51) Int. Cl.
*H04N 1/00* (2006.01)

(52) U.S. Cl. ...... 358/1.15; 358/402; 358/1.18; 358/1.16; 705/340; 705/341; 705/401; 705/406; 705/402; 705/7.11; 705/7.38; 705/7.32; 705/7.12; 705/7.27; 705/408

(58) Field of Classification Search ............... None
See application file for complete search history.

(56) References Cited

U.S. PATENT DOCUMENTS

| | | | | |
|---|---|---|---|---|
| 5,937,084 A * | 8/1999 | Crabtree et al. | ............... | 382/137 |
| 6,401,073 B1 * | 6/2002 | Tokuda et al. | ............... | 705/7.26 |
| 6,549,892 B1 * | 4/2003 | Sansone | ............... | 705/401 |
| 7,006,994 B1 * | 2/2006 | Campbell et al. | ............... | 705/40 |
| 2002/0029202 A1 * | 3/2002 | Lopez | ............... | 705/406 |
| 2002/0144021 A1 * | 10/2002 | Pigos et al. | ............... | 709/330 |
| 2003/0004893 A1 | 1/2003 | Blaesche | | |
| 2003/0074397 A1 * | 4/2003 | Morin et al. | ............... | 709/203 |
| 2003/0074411 A1 | 4/2003 | Nale | | |
| 2003/0109954 A1 * | 6/2003 | Daniels et al. | ............... | 700/226 |
| 2003/0114956 A1 * | 6/2003 | Cullen et al. | ............... | 700/225 |
| 2004/0205081 A1 * | 10/2004 | Chao | ............... | 707/101 |
| 2005/0049890 A1 * | 3/2005 | Kan | ............... | 705/1 |
| 2006/0036614 A1 * | 2/2006 | Simske et al. | ............... | 707/100 |
| 2006/0089921 A1 * | 4/2006 | Witmond et al. | ............... | 705/401 |
| 2006/0167877 A1 | 7/2006 | Lee et al. | | |

OTHER PUBLICATIONS

"Evaluation and Case Study Review of Captiva's Digital Mailroom", 2004, Doculabs, 14 pages.
Shegda et al., "Magic Quadrant for Enterprise Content Management, 2004", Oct. 19, 2004, Gartner, Inc., pp. 1-7.
Shegda et al., "What Constitutes Enterprise Content Management?", Nov. 12, 2004, Gartner, Inc., pp. 1-6.
Lundy et al., "Hype Cycle for Content Management, 2005", Jul. 25, 2005, Gartner, Inc., pp. 1-26.
Shegda, "EMC Documentum Enterprise Content Management Suite", Sep. 12, 2005, Gartner, Inc., pp. 1-15.

(Continued)

*Primary Examiner* — Twyler Haskins
*Assistant Examiner* — Pawandeep Dhingra
(74) *Attorney, Agent, or Firm* — K&L Gates LLP

(57) ABSTRACT

Methods of processing incoming documents. The methods may comprise receiving a plurality of documents in electronic form and classifying each of the plurality of documents into at least one of a plurality of document classifications. The methods may also comprise extracting metadata from the plurality of documents. In addition, the methods may comprise executing a first workflow for processing documents classified in a first document classification selected from the plurality of document classifications and executing a second workflow for processing documents classified in a second document classification selected from the plurality of document classifications.

21 Claims, 20 Drawing Sheets

OTHER PUBLICATIONS

Shegda et al., "EMC Gains Capabilities, but little advantage, with Captiva", Oct. 28, 2005, printed from http://www.gartner.com/DisplayDocument?doc_cd=134044 on Jan. 3, 2008.
"T. Rowe Price Improves Services With Technology", The Journal of Communication Distribution, May/Jun. 2006, pp. 28-29.
International Search Report (PCT/US07/78277) dated Oct. 30, 2008 (3 pages).
Written Opinion of the International Searching Authority (PCT/US07/78277) dated Oct. 30, 2008 (5 pages).

* cited by examiner

FIG. 5F

DOCUMENT HANDLING

CROSS-REFERENCE TO RELATED APPLICATIONS

This application claims the benefit of U.S. Provisional Patent Application Ser. No. 60/825,367 filed on Sep. 12, 2006, which is incorporated herein by reference.

BACKGROUND

Many companies expend significant resources sorting, analyzing and directing incoming mail and other documents. For example, when mail is received, mailroom personnel must sort the mail, determine a recipient or recipients and direct the mail appropriately. In addition, mailroom personnel must handle exceptional mail (e.g., returned mail, mail not directed to a clear recipient, etc.). Because these tasks are often performed by humans, the cost to execute even these simple procedures is often great. Accordingly, there is a need for automation systems for handling mail and other incoming documents.

SUMMARY

In one embodiment, the present disclosure is directed to methods of processing incoming documents. The methods may comprise receiving a plurality of documents in electronic form and classifying each of the plurality of documents into at least one of a plurality of document classifications. The methods may also comprise extracting metadata from the plurality of documents. In addition, the methods may comprise executing a first workflow for processing documents classified in a first document classification selected from the plurality of document classifications and executing a second workflow for processing documents classified in a second document classification selected from the plurality of document classifications.

In another embodiment, the present disclosure is directed to methods of processing returned mail documents. The methods may comprise receiving a plurality of returned mail documents in electronic form and extracting metadata from the returned mail documents. In addition, the methods may comprise correlating a returned mail document selected from the plurality of returned mail documents to a first client account considering the extracted metadata. If the returned mail document comprises a forwarding address, instructions may be generated for re-sending the returned mail document to the forwarding address. Also, a status of the first client account may be updated.

FIGURES

Embodiments of the present invention are described below by way of example in conjunction with the following figures, wherein:

FIGS. 5A-5F illustrate screen shots of a user interface according to various embodiments;

DETAILED DESCRIPTION

Figure 1:
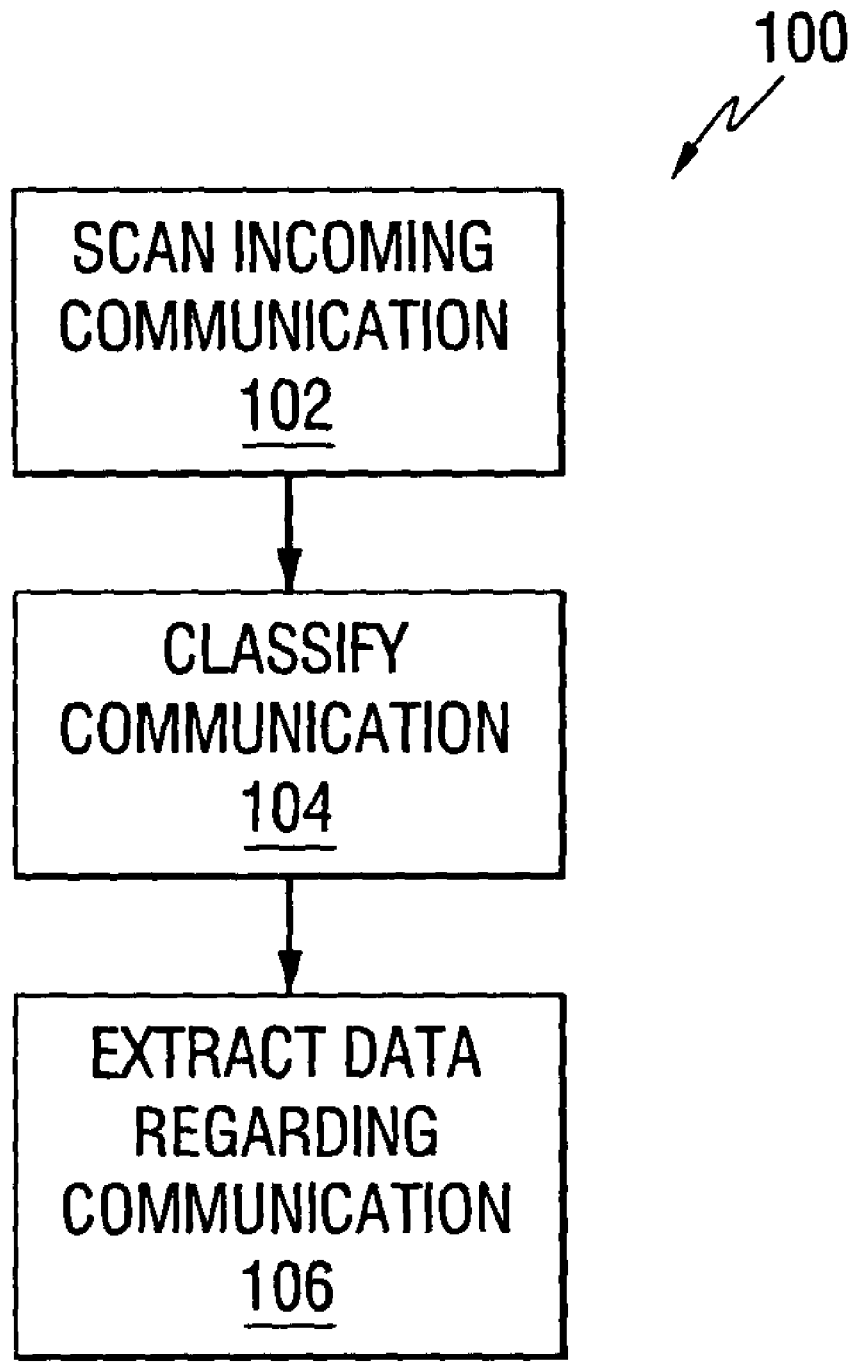
FIG. 1 illustrates a flowchart showing a process flow according to various embodiments.

Various embodiments of the present invention are directed to methods and systems for handling incoming documents such as, for example, paper mail, faxes, etc. FIG. 1 shows a process flow 100 illustrating a method, according to various embodiments, for handling incoming documents. At step 102, an incoming document may be scanned to an electronic image. The document may be scanned according to any suitable method using any suitable hardware. For example, in various embodiments, scanners produced by OPEX and/or KODAK may be used. In various embodiments, scanning the document may also involve performing optical character recognition (OCR) to generate an electronic version of any text present on the document. Also, in various embodiments, for example, when the document is an incoming letter, the envelope as well as its contents may be scanned. It will be appreciated that some kinds of documents may not need to be scanned. For example, some faxes, e-mails, e-mail attachments, etc., may be received directly in an electronic format, alleviating the need for scanning.

At step 104, the document may be classified, for example, based on a document type. The available document types may, in various embodiments, depend on the applications. For example, a system for handling incoming legal documents, such as the one described below, may classify documents as pleadings, complaints, subpoenas, etc. The classification may be based, for example, on text present on or in the document or, in various embodiments, may be based on a barcode or other indication present on the documents. At step 106, data regarding the document may be extracted and stored. The data may include, for example, a recipient, a sender, an account number to which the information pertains, etc. The extracted information may, in various embodiments, be based on text retrieved from the document through OCR.

Figure 2:
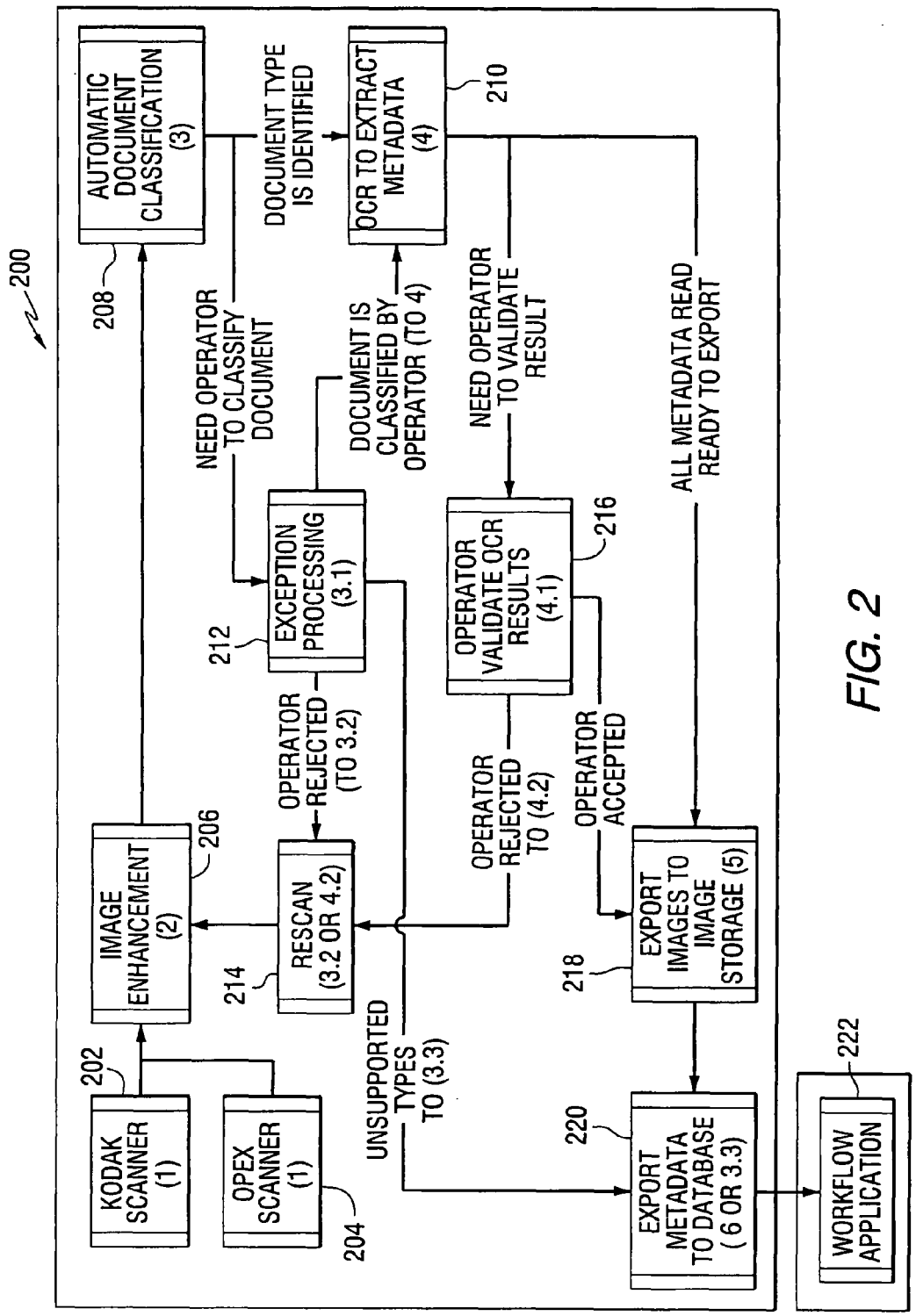
FIG. 2 illustrates a workflow diagram showing a process flow according to various embodiments.

FIG. 2 shows a workflow 200, according to various embodiments, for handling incoming documents. An incoming document may be scanned at KODAK scanner 202, OPEX scanner 204, or any other suitable type of scanner. It will be appreciated that scanning incoming documents may involve opening the documents and placing the documents on the scanners in batches. In various embodiments, the scanners may also be configured to automatically open incoming documents. At box 206, an image enhancement algorithm may be run. The image enhancement algorithm may be any suitable algorithm for improving the quality of the scanned image of the document. At step 208, the document may be automatically classified. The classification may be based on any suitable criteria. For example, the document may be classified based on extracted OCR text, a general pattern or shape of the scanned image of the document, a bar code present on the document, the position of certain text or symbols on the documents, etc.

Figure 3A:
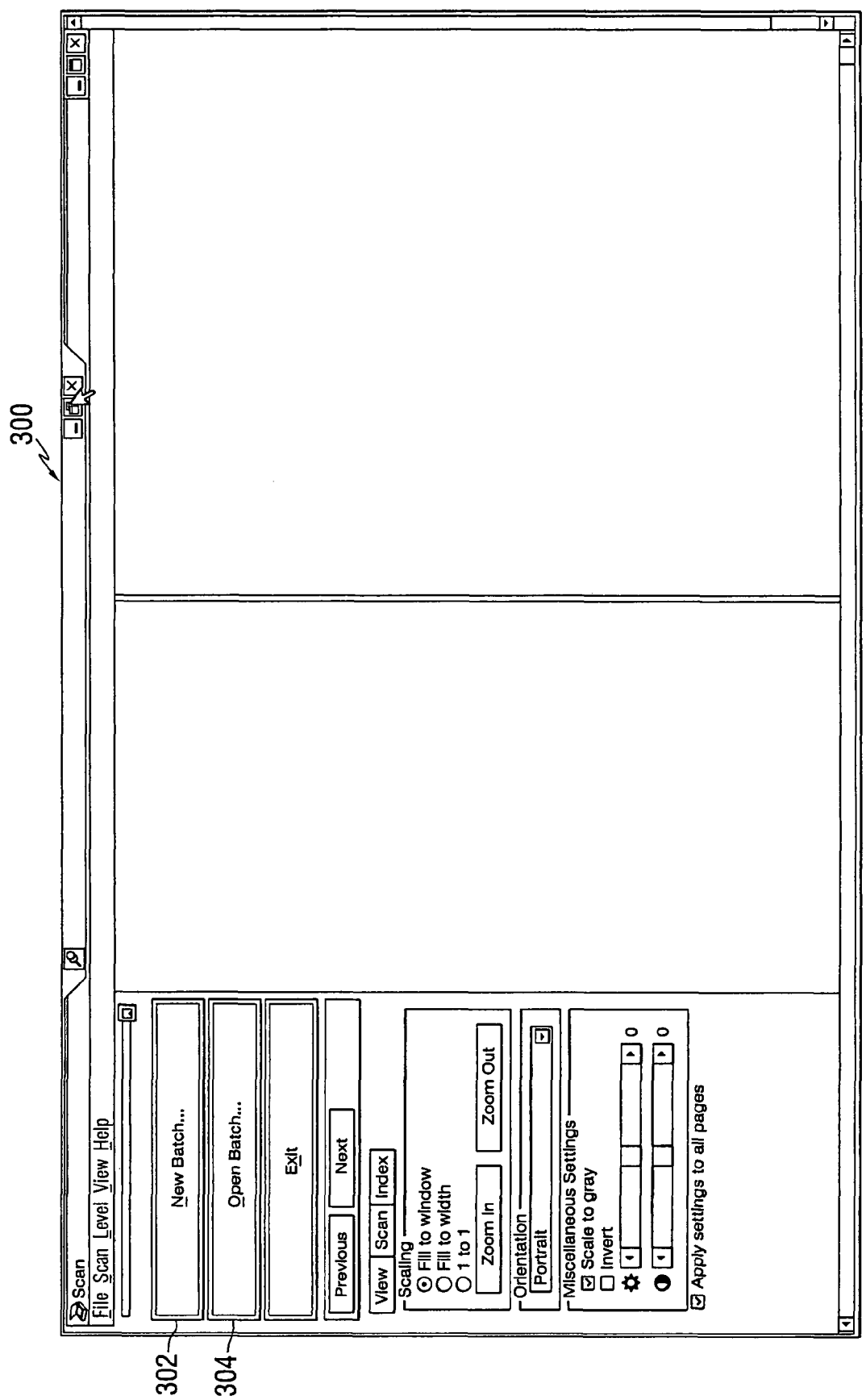
FIGS. 3A-3E illustrate screen shots of a user interface according to various embodiments.

If the document classification is successful, then the workflow 200 may proceed to step 210, for example, as described below. If the classification is unsuccessful, then exception processing may be performed at step 212. In various embodiments, exception processing may be performed by a human operator utilizing a user interface such as, for example, interface 300 shown in FIGS. 3A-3E. It will be appreciated that, in various embodiments, exception processing may handle unclassified documents in batches. For example, FIG. 3A shows the interface 300 with a new batch button 302 and an open batch button 304. Selecting the new batch button 302 may cause the interface 300 to create a new batch of unclassified documents. The new batch of unclassified documents may include, for example, documents that have been rejected at the automatic classification step 208, but have not yet been considered by the interface 300. Selecting the open batch button 304 may open within the interface 300 an existing batch of unclassified documents.

Figure 3B:
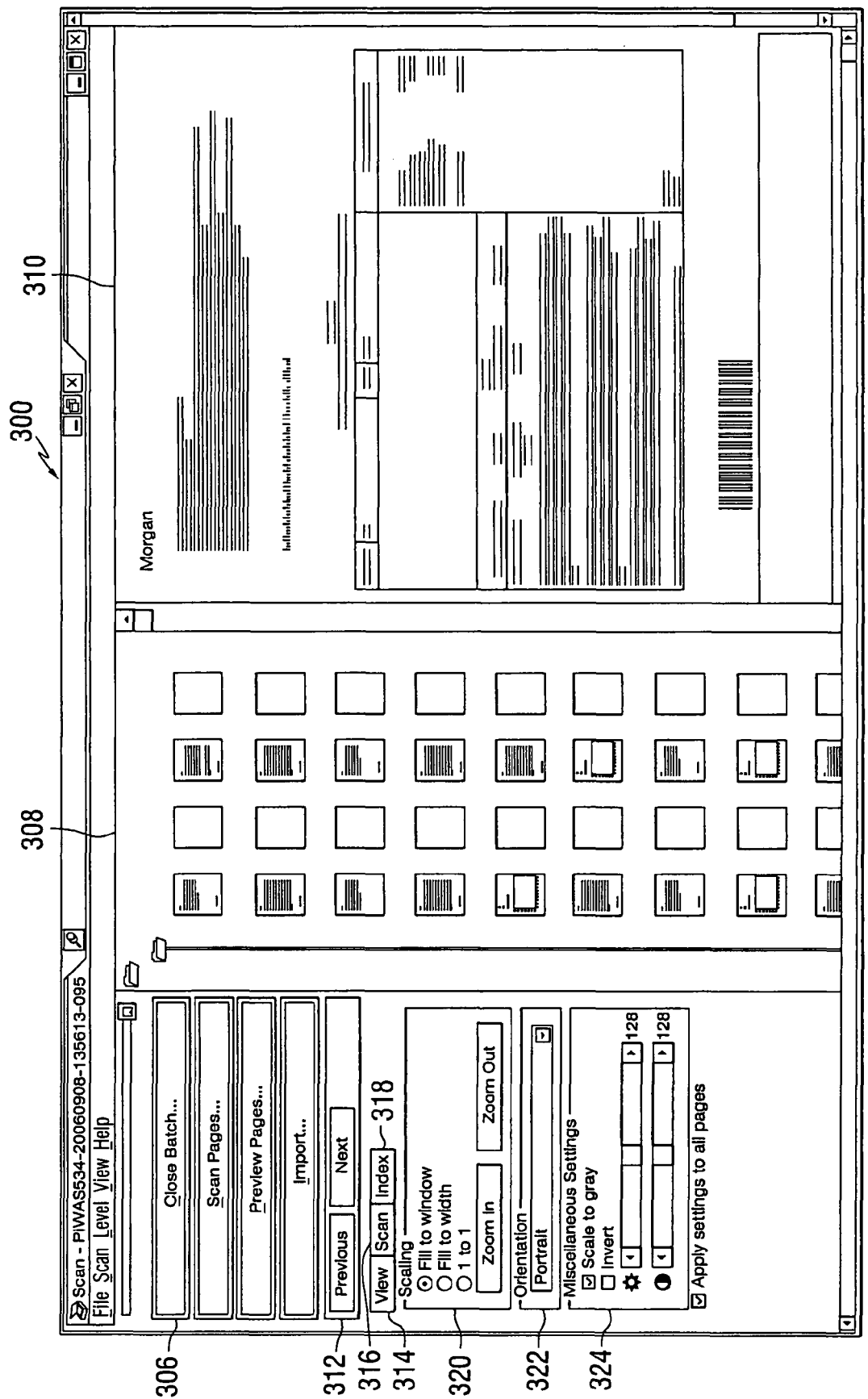

FIG. 3B shows the user interface 300 with an open batch of documents. Field 308 may display thumbnail images or any other suitable indications of unclassified documents in the batch. Field 310 may show a large image of a single unclassified document. The operator may select the unclassified document shown at field 310, for example, by selecting the indication of the document at field 308, or for example, by navigating through the documents in the batch using buttons 312. The operator may also manipulate the image shown at field 310, for example, using the controls at field 314. A scaling box 320 may include controls for changing the scale of the image at field 310. An orientation box 322 may allow the operator to change the orientation of the image at 310 to a portrait, a landscape and/or rotations thereof. Additional settings at box 324 may allow the operator to manipulate the color, brightness, contrast, etc., of the image at field 310.

Figure 3C:
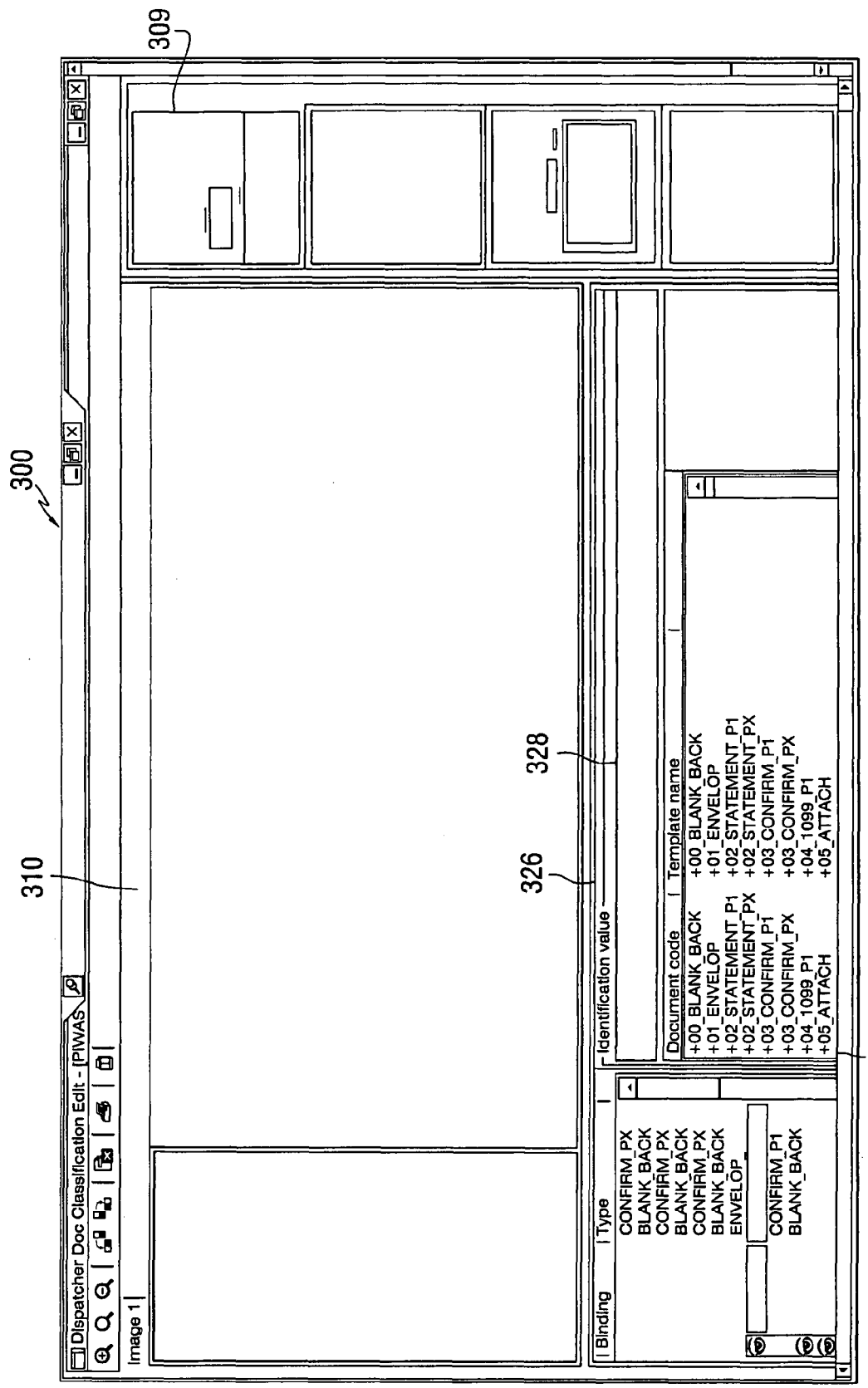
Figure 3D:
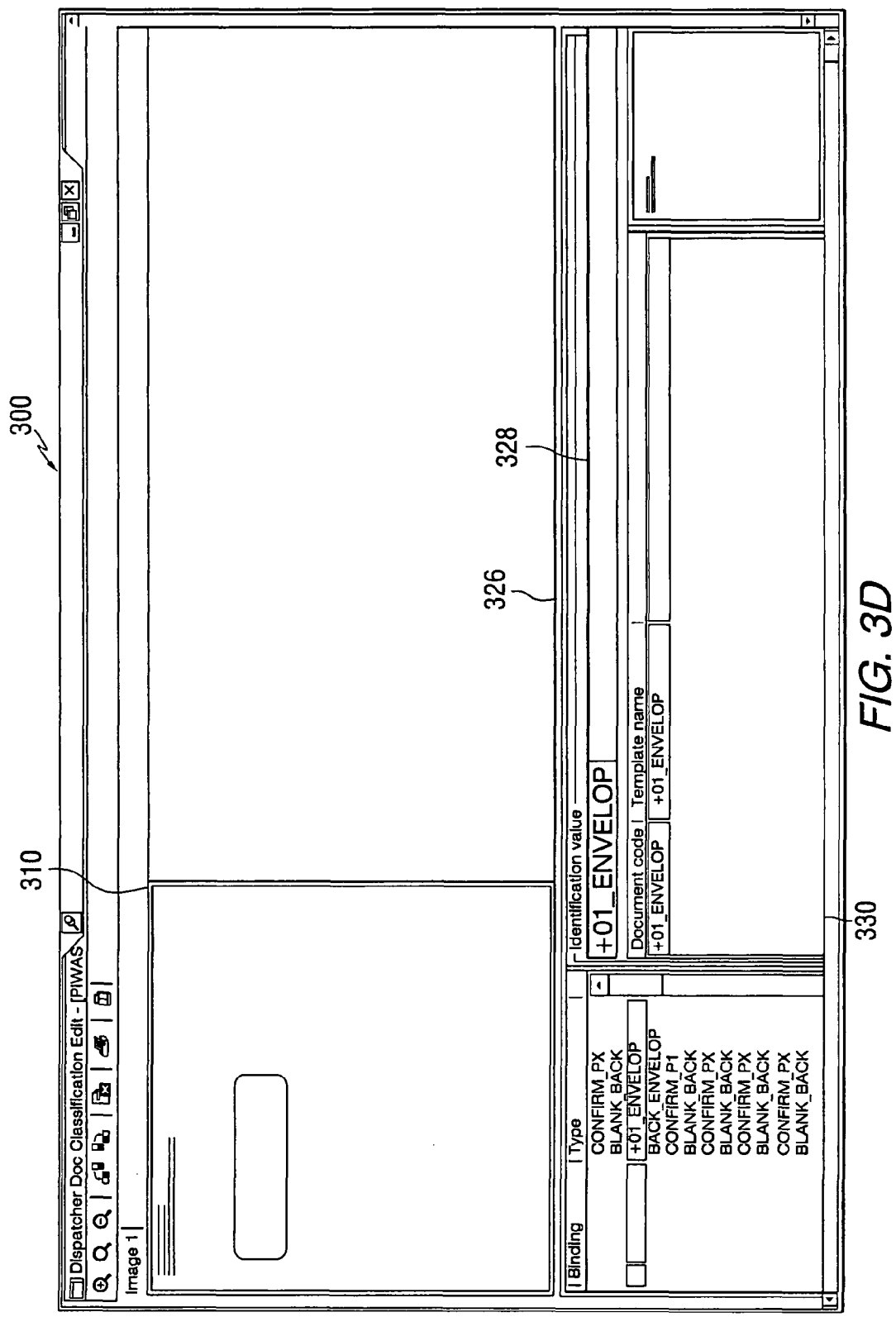
Figure 3E:
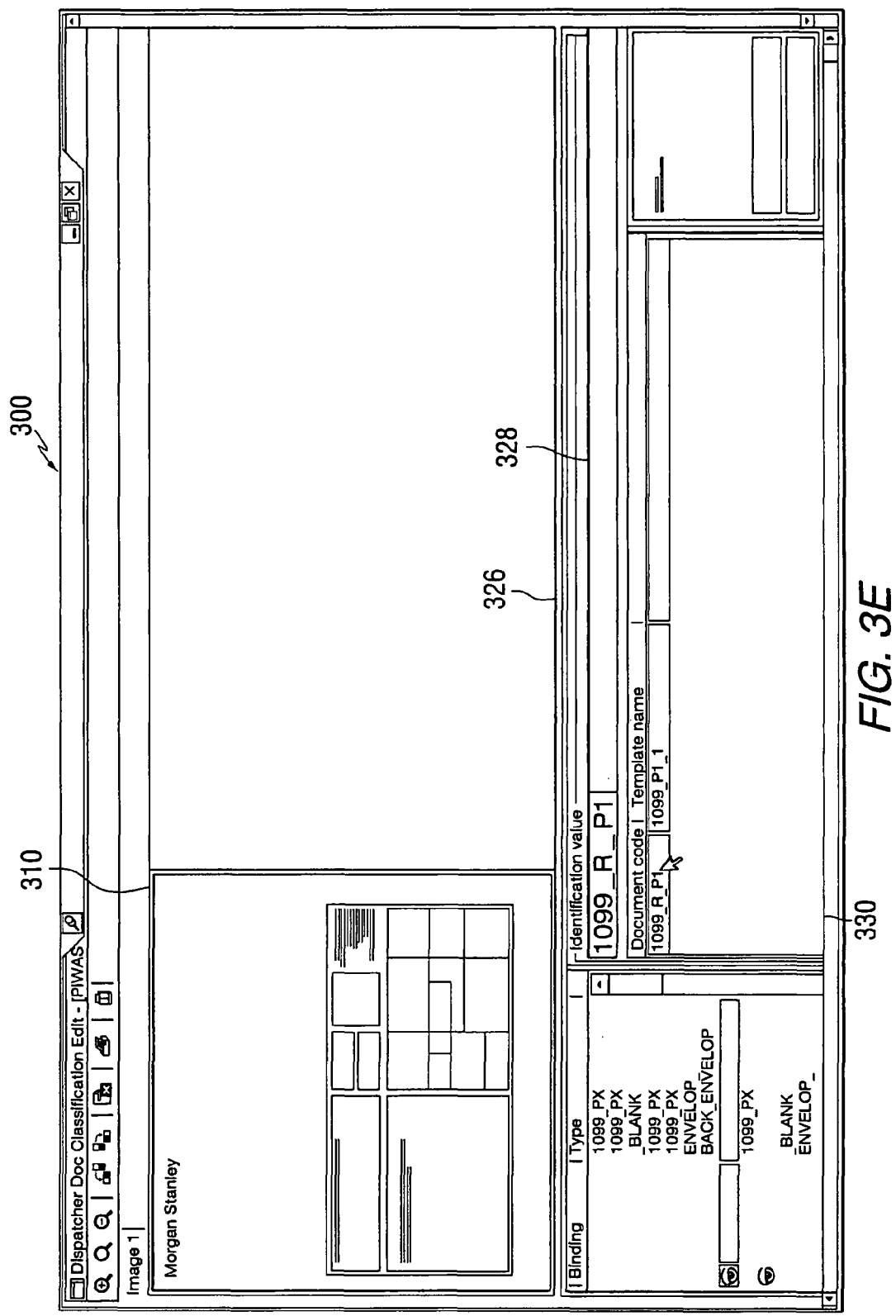

When the operator has classified a particular document, the operator may indicate that classification at window 326, shown in FIG. 3C. For example, a textual indication of the classification may be entered at field 328. Also, the textual indication may be selected from the list of possible classifications at field 330. For example, FIG. 3D shows a image of an envelope at field 310. The operator has selected the appropriate classification for envelope at fields 326, 328 and 330. FIG. 3E shows an image of a tax form/1099 document at window 310. Again, the operator has selected the appropriate classification at fields 326, 328 and 330.

Referring back to FIG. 2, if the operator is unable to classify the unclassified document at step 212, then the document may be re-scanned at step 214. The process may then proceed to steps 206, 208, etc., as described above. Also, if the document is found to be of an unsupported type, the document may be otherwise handled. For example, the document, or its scanned image, may be routed manually.

After classification, metadata regarding various documents may be extracted at step 210. The metadata may be extracted, for example, by performing OCR on the scanned images captured by the scanners 202, 204. In various embodiments, the metadata may be extracted automatically. It will be appreciated that, when a document has been identified as a particular type of communication (e.g., a particular form, a letter, etc.), it may be possible to extract specific information from known locations on the document. For example, when a document is identified as a tax form/1099 document, various information, such as, the name of the taxpayer, the account number of the taxpayer, that date that the form was originally mailed etc., may be extracted from known locations. Although the workflow 200 shows OCR performed after document classification, it will be appreciated that, in various embodiments, text derived from OCR may form some or all of the basis for classification.

Where the extraction of metadata of a particular document is successful, the workflow may proceed to export the scanned image of the document and the extracted metadata to a database or databases at steps 218 and 220 respectively. If the metadata extraction is not successful, then an operator may manually extract and/or verify the metadata at step 216. The metadata extraction may be unsuccessful, for example, if the OCR fails to recognize any characters in an expected location, or if the OCR does recognize characters, but fails to do so to a predetermined level of confidence, accuracy, etc. The operator may manually extract and/or verify metadata, for example, through a user interface (not shown). The user interface may include an image of a document and an indication on the image of a region where the desired metadata should be. In various embodiments, the interface may also give an indication of the results of an OCR scan of the region, for example, if the OCR scan generated a result, but that result was unacceptable. After reviewing the image and the region, the operator may enter the desired metadata into the interface and the workflow 200 may proceed to steps 220 and 218 as described above. If the operator is unable to identify the desired metadata, then the workflow 200 may proceed to step 214, where the document may be rescanned.

At step 222, the image and metadata information regarding the documents may be used according to any suitable workflow. The type of workflow chosen may depend on the kind of documents considered. Exemplary workflows for handling returned mail and handling incoming legal documents are described below, however, it will be appreciated that any suitable workflow for handling any suitable type of documents may be selected.

Figure 4:
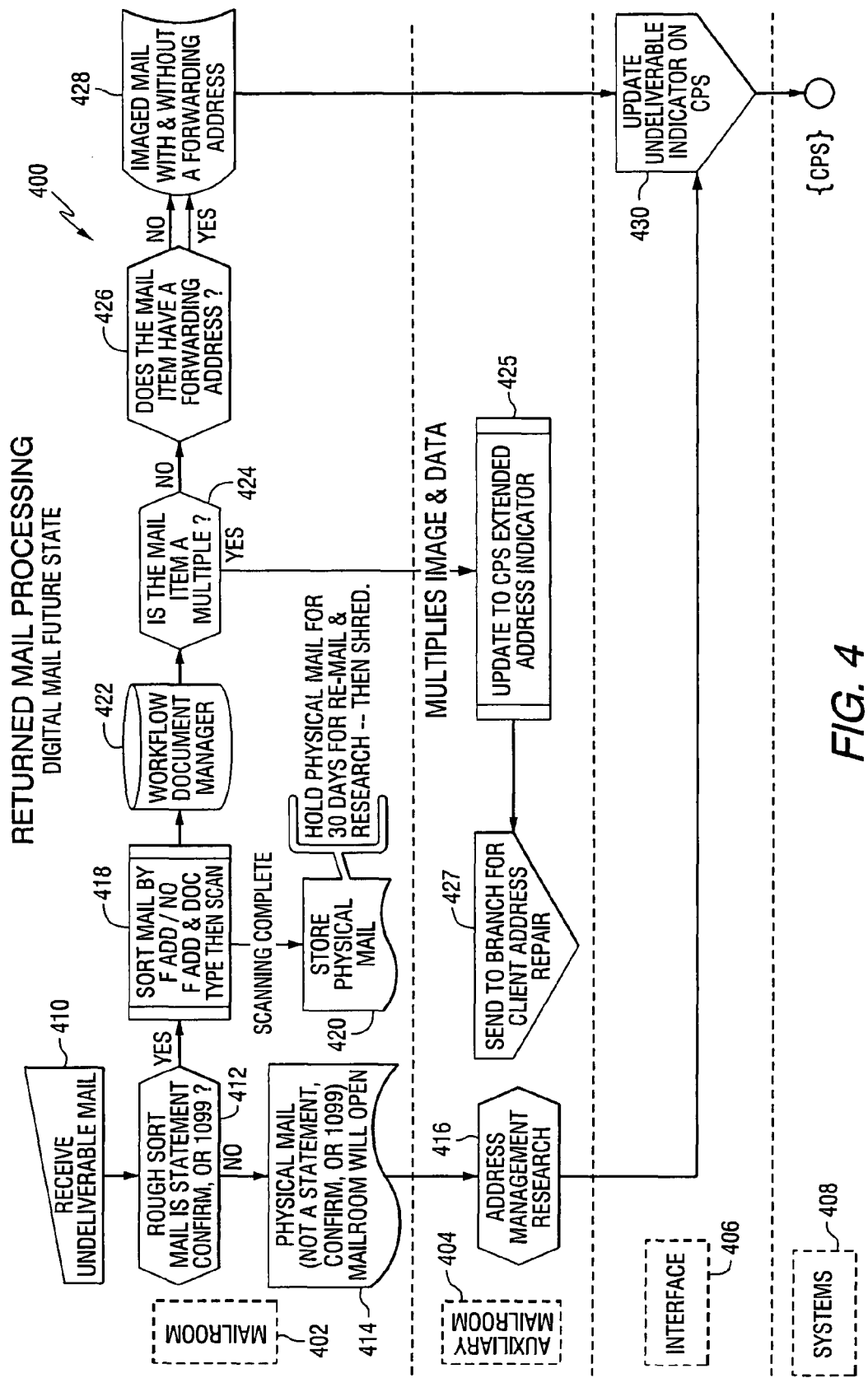
FIG. 4 illustrates a workflow diagram showing a process flow according to various embodiments.

FIG. 4 shows a workflow 400 for handling returned mail documents. As described, the workflow 400 may be tailored to pertain to documents that may be returned to a financial services firm such as, for example, tax form/1099 documents, confirmations, account statements, etc. It will be appreciated, however, that the workflow 400 may be adapted for handling returned mail documents in various other settings. In addition, the workflow 400 as shown in FIG. 4 indicates the locations and/or systems where various steps are performed. For example, steps in row 402 may be performed at a mailroom location. Steps in row 404 may be performed in an auxiliary mailroom or address research location. Steps in row 406 may be performed by an interface between the workflow 400 and a system for maintaining client information for the firm. Finally, row 408 shows steps performed by the system. It will be appreciated, though, that various embodiments of the workflow 400 may have various steps performed at locations, and/or by systems, other than those indicated.

Referring again to the workflow 400, undeliverable mail may be received at the mailroom at step 410. It will be appreciated that, in various embodiments, the workflow 400 may be implemented to handle all or most returned mail, or may alternatively be implemented to handle only selected groups of returned mail. For example, as shown in FIG. 4, the workflow 400 is configured to handle returned tax forms/1099's, account statements, and confirmations. A rough sort may be performed at step 412 to identify physical mail 414 that does not fall into one of the selected groups. This physical mail 414 may be set aside for further analysis at step 416.

The physical mail that does fall into the selected groups may be scanned at step 418, for example, according to the process flow 200 described above. In various embodiments, the physical mail may be scanned in batches of like documents (e.g., tax forms/1099's may be scanned together). Also, in various embodiments, it may only be necessary to scan the envelope and the first page of its contents. Also, as described above, various embodiments may include extracting metadata from the returned mail. Example metadata categories may include, the addressee, the address that the mail was sent to, any forwarding address sticker that may be present, the type of form, the client account that the form relates to, etc. After scanning, the physical mail 420 may be stored. In various embodiments, the physical mail 420 may be stored for a given amount of time, (e.g., 30 days, 60 days, etc.). If the physical mail 420 has not been remailed or otherwise dealt with at the end of the given amount of time, then it may be destroyed. In this way, additional research may be performed on the mail, if necessary, but it may not occupy storage space indefinitely.

At step 422, the scanned images of the returned mail may be correlated to a client account. In various embodiments, this may simply involve analyzing a client account number stored with metadata. Sometimes, however, the client account number stored with the metadata may be incorrect and/or the correlation may fail. In various embodiments, a human operator may review cases where the correlation fails and make corrections, if possible. At step 424, it may be determined if the particular item has been returned to the firm more than once. If so, then a client information database (not shown) may be updated accordingly at step 425, for example, according to one or more of process flows 600 and 700 described below. Also, information regarding the returned mail and the account may be forwarded to the branch office handling the account at step 427. In this way, the branch office may be able to contact the client and obtain new contact information.

At step 426, it may be determined whether the returned mail has a forwarding address. If it does, then an instruction may be generated and other steps taken to re-mail the document to the forwarding address. Regardless of whether the returned mail has a forwarding address, its image may be forwarded at step 430 to client information system interface 406, which may update the client information database (not shown), for example, according to one or more of process flows 600 and 700 described below.

Figure 6:
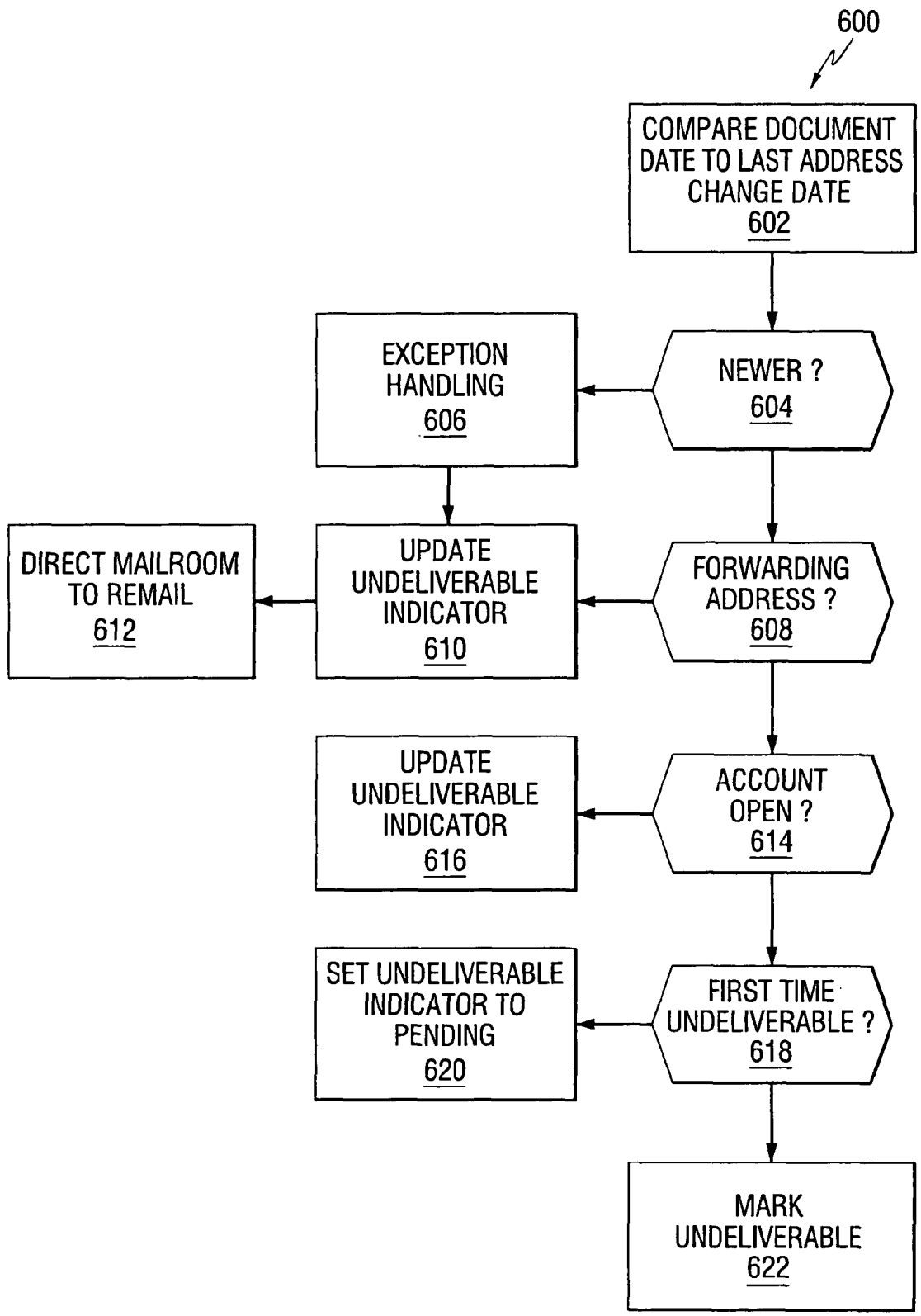
FIGS. 6-7 illustrate flowcharts showing process flows according to various embodiments.

FIG. 6 shows a process flow 600, according to various embodiments, for updating address information in a client database in response to a returned mail document. At step 602, the date of the returned mail document (e.g., the date on which it was sent) may be compared to the date of the last change in the recorded address for the corresponding client. If the date of the returned document is older than the date of the last address change, it may indicate that the client's recorded address has changed since the mailing of the returned document. The returned document may be referred to exception handling at step 606, for example, to verify that the client's address has changed since the returned mail document was sent and resend the document to the new address.

If the date of the returned mail document is newer than the last change in the client's recorded address, then the process flow may proceed to step 608, where it is determined whether the returned mail document includes a forwarding address. If a forwarding address is included, then an undeliverable indicator describing the client may be updated at step 610. If the client's account is marked deliverable, then the indicator may be changed to "pending undeliverable" and the date set to the current date. If the indicator is marked "pending undeliverable," then it may be changed to "undeliverable" and the date set to the current date. If the client's account is already marked undeliverable, then no action may be taken. After the undeliverable indicator has been updated, various embodiments of the process flow 600 may involve requesting that the mail-room resend the returned mail document to the forwarding address at step 612.

At step 614, it may be determined whether the client account corresponding to the returned mail document is open. If the client account is closed, then its undeliverable indicator may be updated at step 616 (e.g., the indicator may be changed to "undeliverable"). At step 618, it may be determined whether the returned mail document has been returned more than once. If it has, then the undeliverable indicator relating to the account may be set to "undeliverable" at step 622. If the returned mail document has only be returned once, then the undeliverable indicator may be sent to "pending undeliverable" at step 620. It will also be appreciated that, in various embodiments, the client information database may periodically update clients' undeliverable indicators. For example, if a client's undeliverable indicator has been set to "pending undeliverable" for a given amount of time (e.g., six months) without being subsequently updated to "undeliverable," then the indicator may be updated to read "deliverable." In this way, if mail is returned a first time, but not a second, the client's undeliverable indicator may not be indefinitely set to "pending undeliverable."

Figure 7:
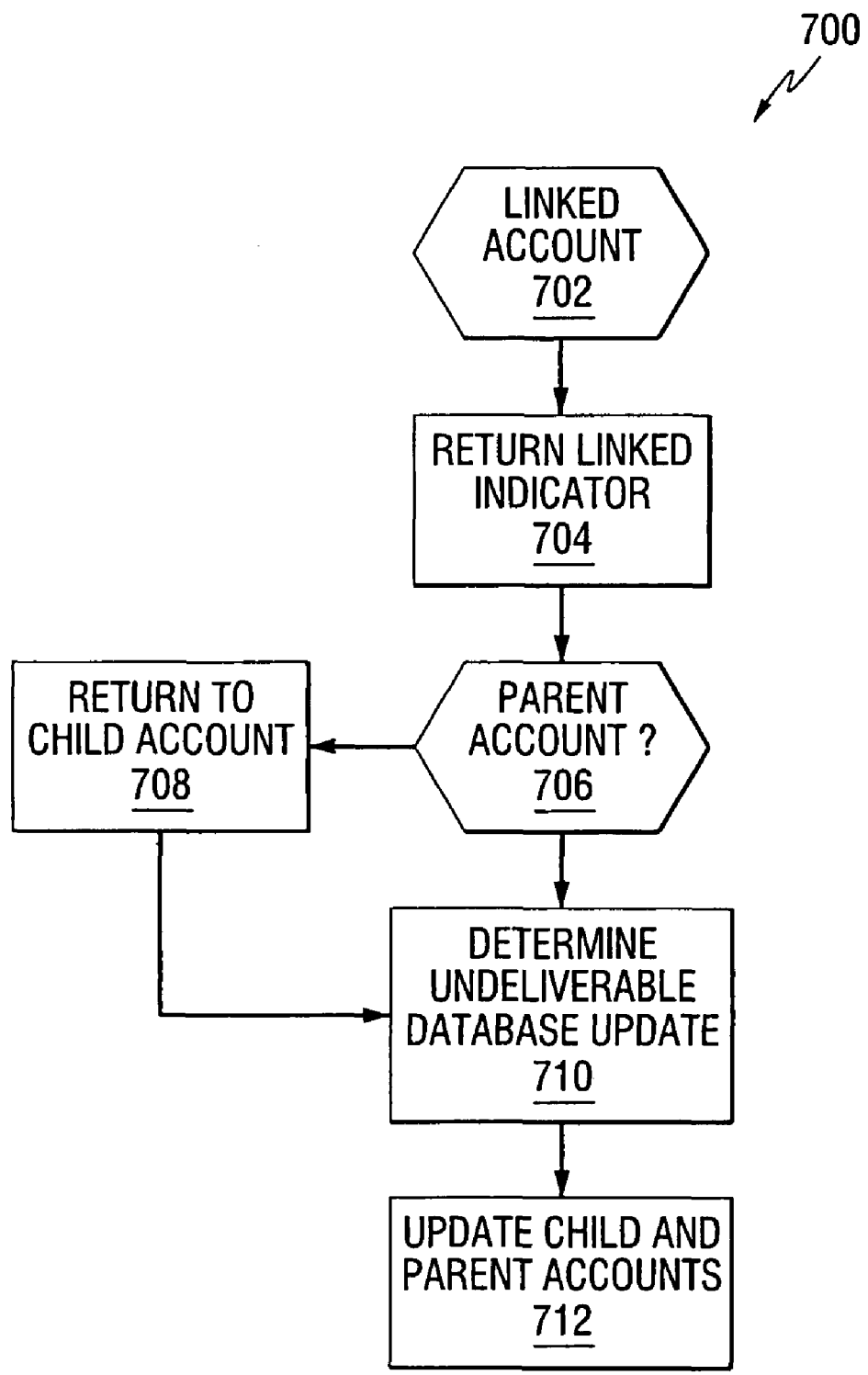

FIG. 7 shows an additional process flow 700 for handling linked client accounts (e.g., accounts having the same associated client address). At step 702, it may be determined whether a given returned mail document corresponds to a linked account. If so, an indicator of the linked account may be returned at step 704. If the linked account is a parent account (step 706), then the process flow may return to the child account at step 708. The undeliverable indicator status of the child account may be determined at step 710, for example, according to the process flow 600. The parent account may have its undeliverable indicator updated similarly at step 712.

Figure 8:
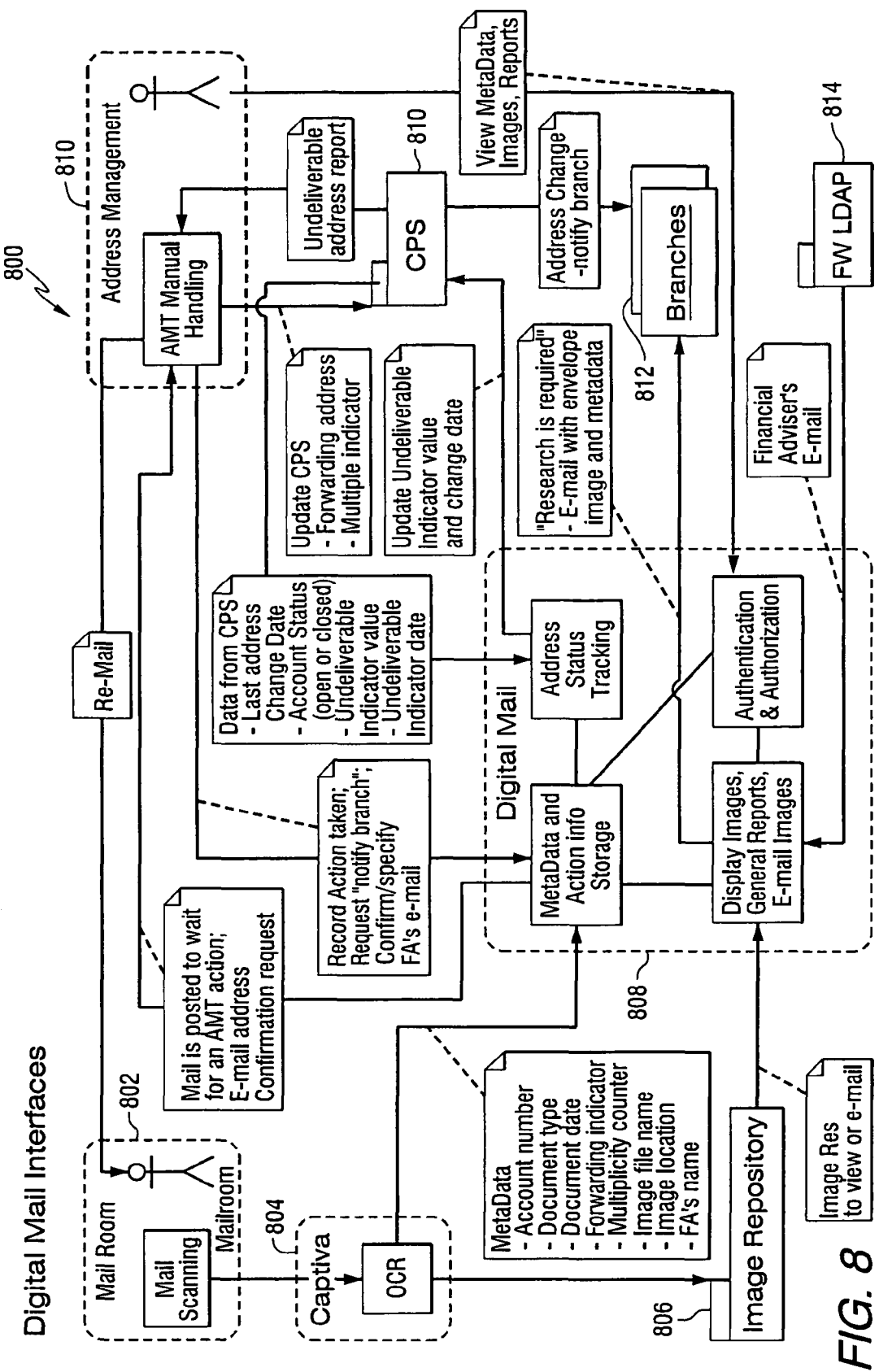
FIG. 8 illustrates a workflow diagram showing a process flow according to various embodiments.

FIG. 8 shows an additional workflow 800 illustrating various embodiments of a workflow for handling returned mail. At mailroom 802, returned mail documents may be scanned into a document handling software package 804, such as, for example, that available from CAPTIVA. The software package 804 may perform OCR and extract metadata, for example, as described above. The metadata may be forwarded to a digital mail workflow system 808. Scanned images of the returned mail documents may also be forwarded to the digital mail workflow system, but may also be forwarded to an image repository 806.

The system 808 may perform various steps for analyzing the documents, correlating the documents to client accounts, updating the client accounts on client databases 810, etc., for example, as described above with respect to 400, 600 and 700. Operators, for example, at address management location 810, may handle exceptions encountered by the system 808. It will be appreciated that when the system 808 determines that a clients undeliverable indicator status has changed, an e-mail may be directed toward the branch or branches 812 that handle the client.

Figure 5A:
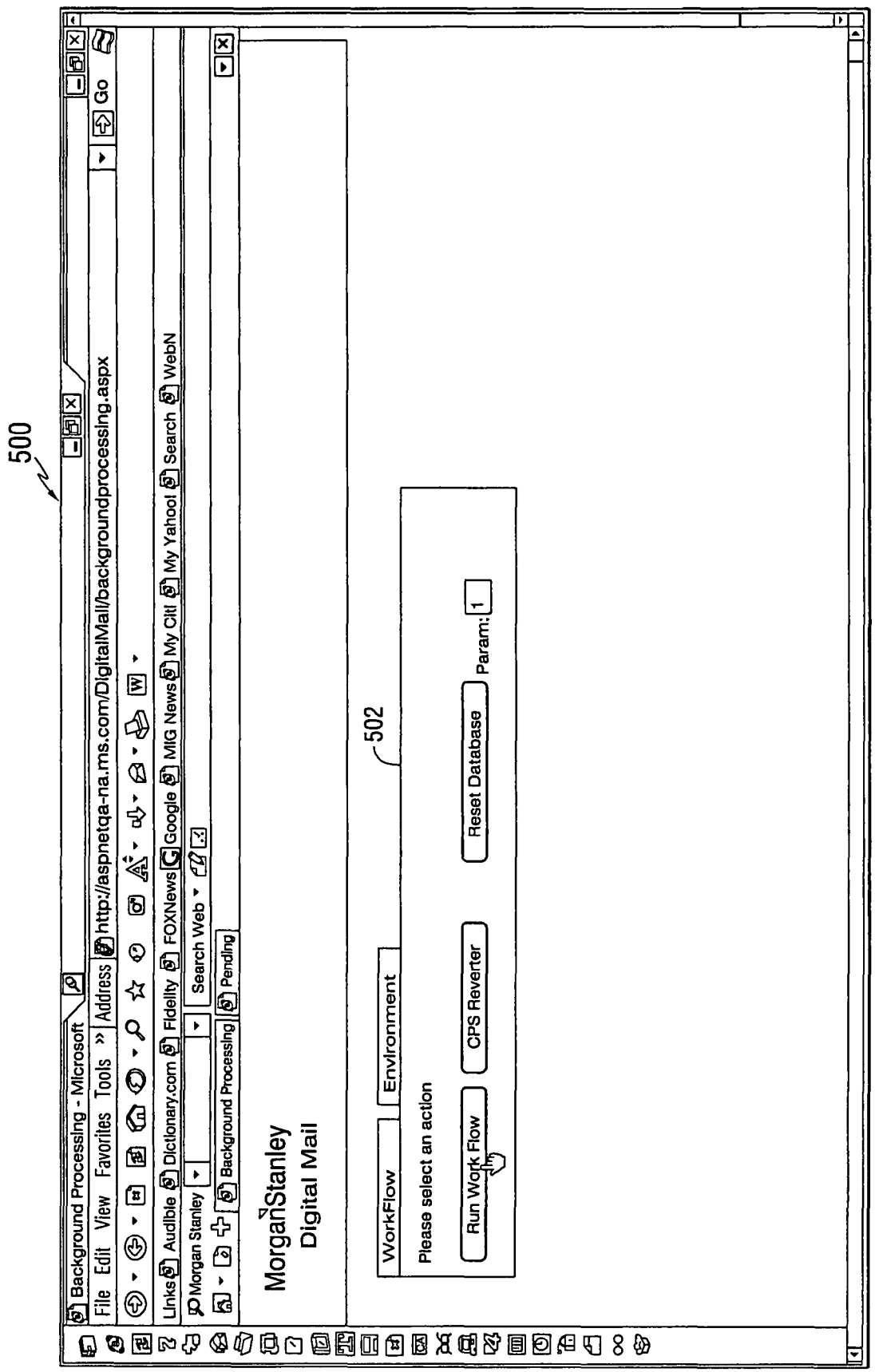
Figure 5B:
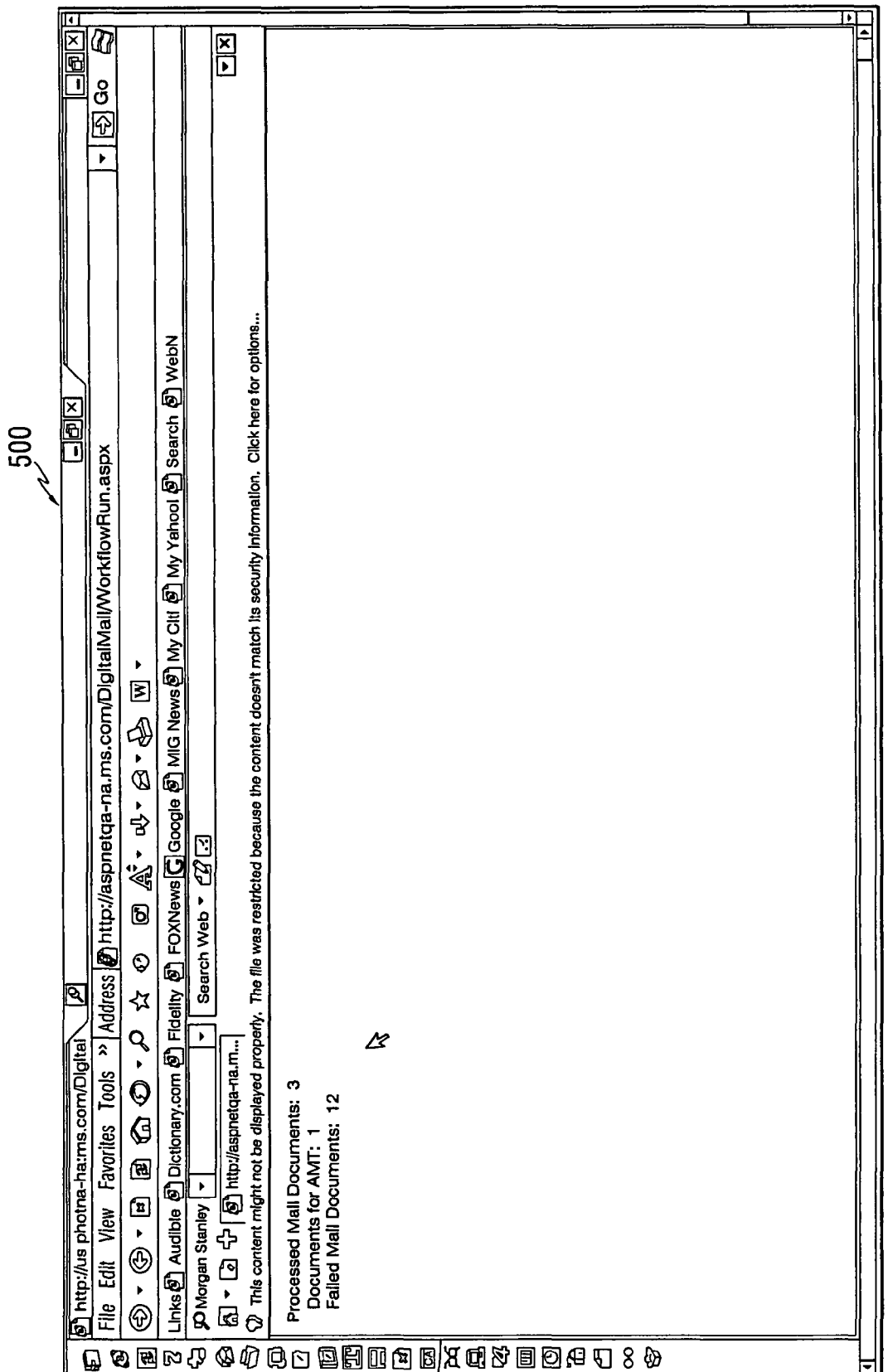
Figure 5C:
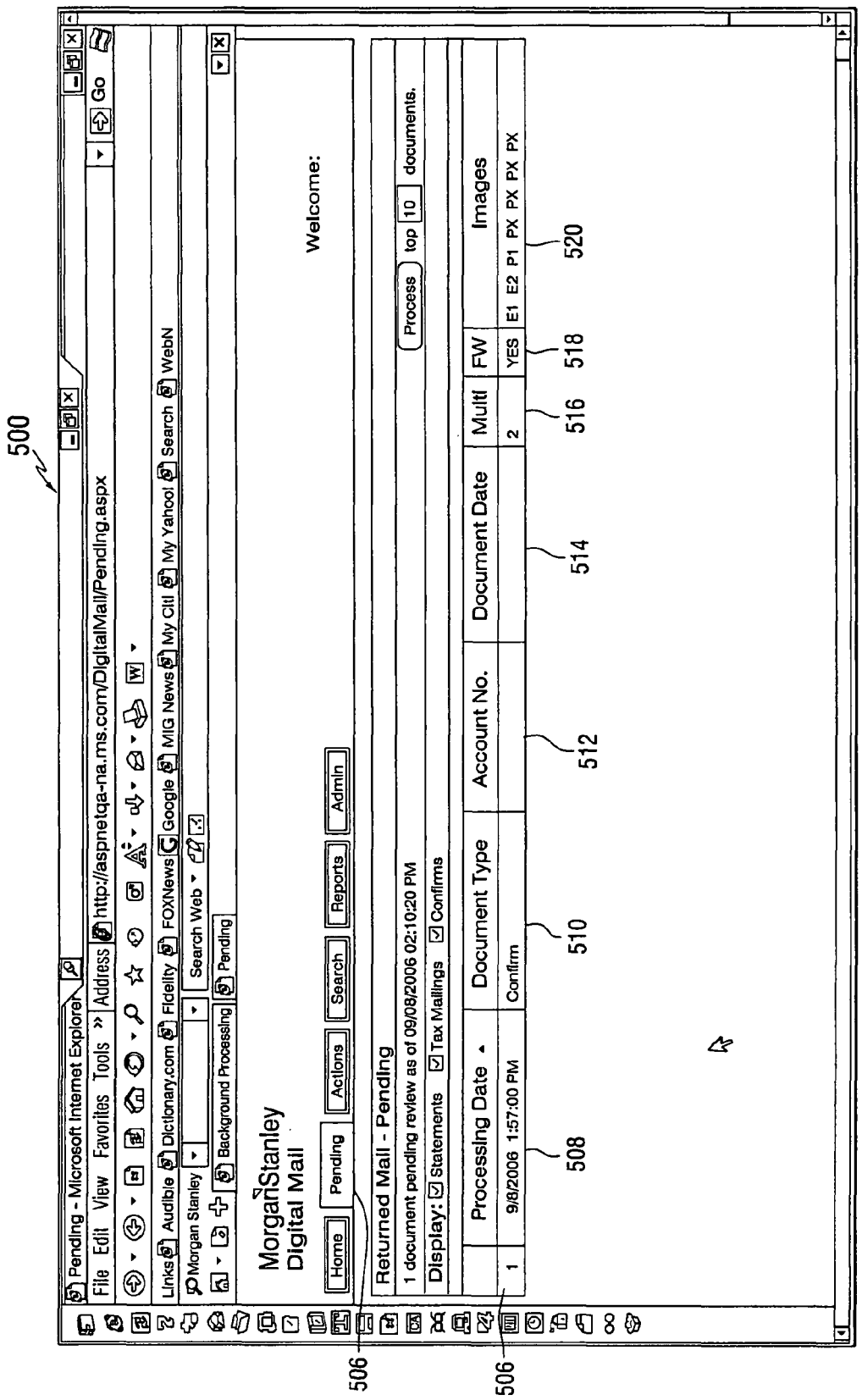
Figure 5D:
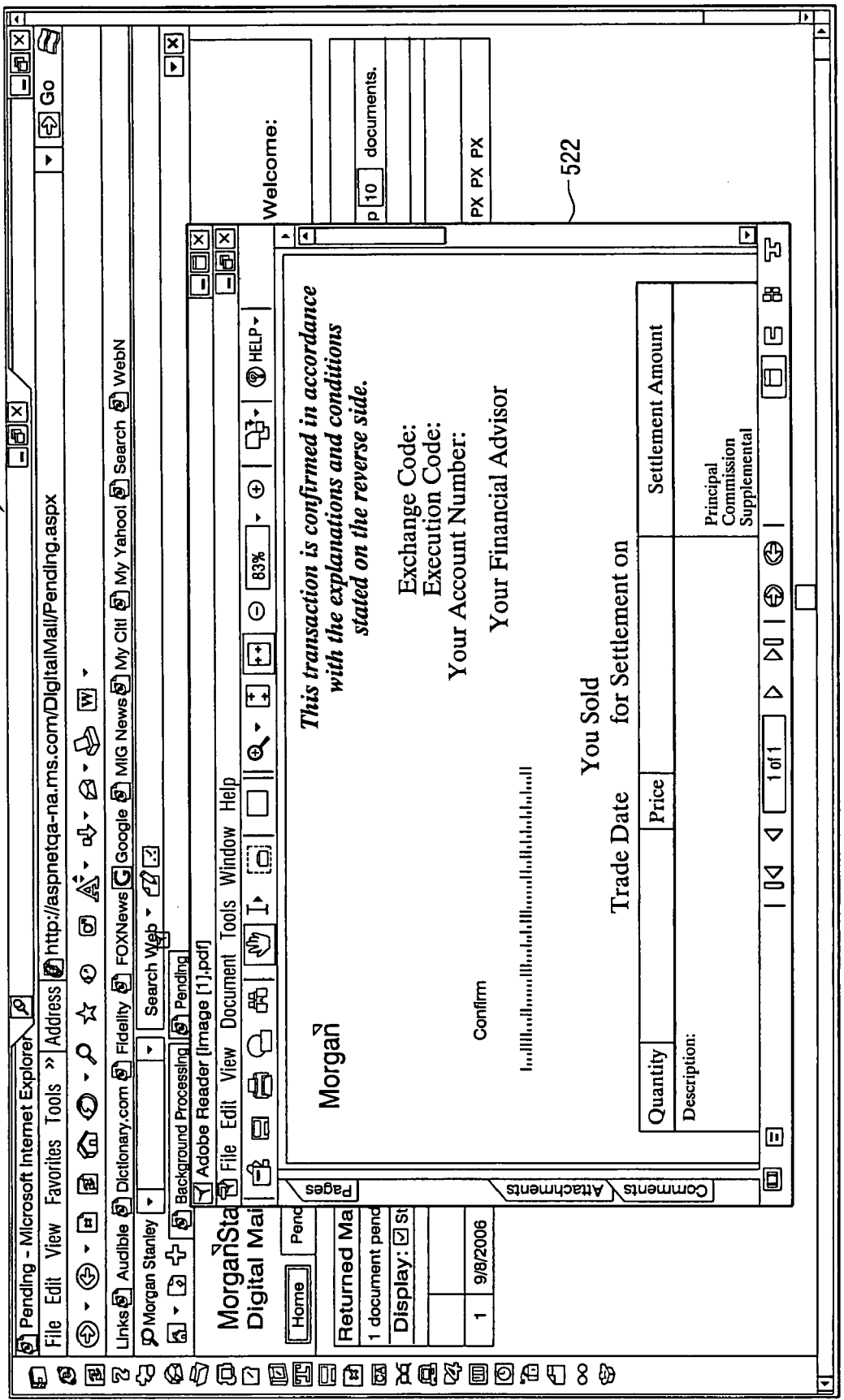

It will be appreciated that various portions of the process flows 100, 200, 400, 600, 700 and 800 may be observed and/or facilitated by an operator. FIGS. 5A-5F show a user interface 500, according to various embodiments, for providing an operator with tools to observe and/or facilitate the various process flows. At field 502, shown in FIG. 5A, the operator may execute one or more of the process flows for example, by selecting the appropriate button. This may cause the various process flows to execute automatically. A report of their execution may be provided, for example, at field 504 shown in FIG. 5B. The report may list the number of returned mail documents that were successfully processed, and the number that failed processing, for example, because they could not be correlated to a client account. A field 506, under tab 505, is shown in FIG. 5C. The field 506 lists information regarding any pending returned mail documents. The information may include, for example, a processing date 508, a document type 510, an account number 512, a document date 514, whether the document has been returned more than once 516, whether the returned mail document included a forwarding address 518, and links 520 to the scanned image of the document. When the links 520 are selected, one or more scanned image of the document may be displayed, for example, in window 522 shown in FIG. 5D.

In various embodiments, field 506 may list returned mail documents that were not successfully correlated to a client account. In this case, the operator may view the images associated with links 520 and attempt to manually correlate the documents to a client account. In various embodiments, individual operators may select batches of uncorrelated mail documents and lock them. In this way, other operators may not be permitted to access the locked documents, preventing multiple operators from accessing or changing the documents simultaneously.

Figure 5E:
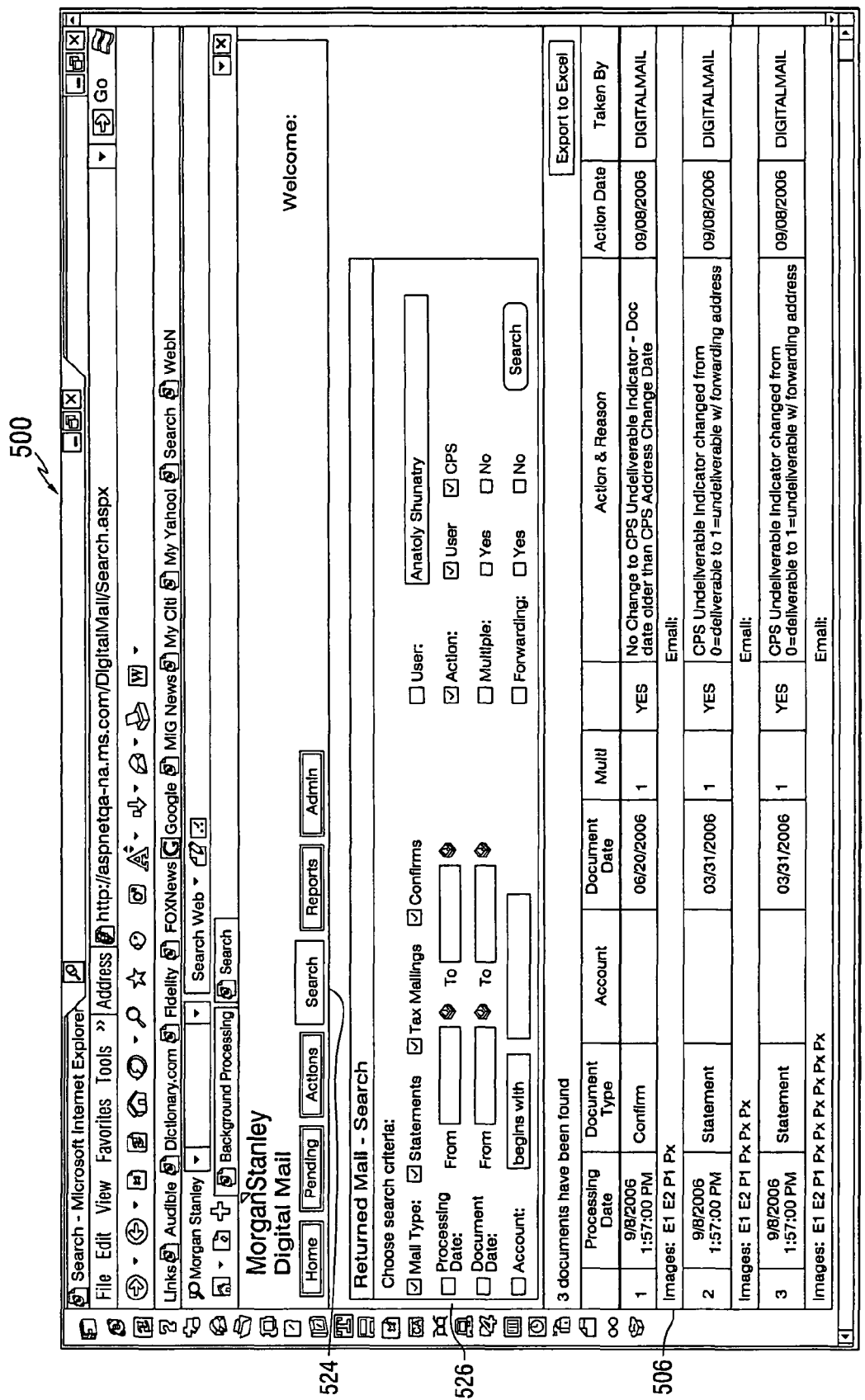
Figure 5F:
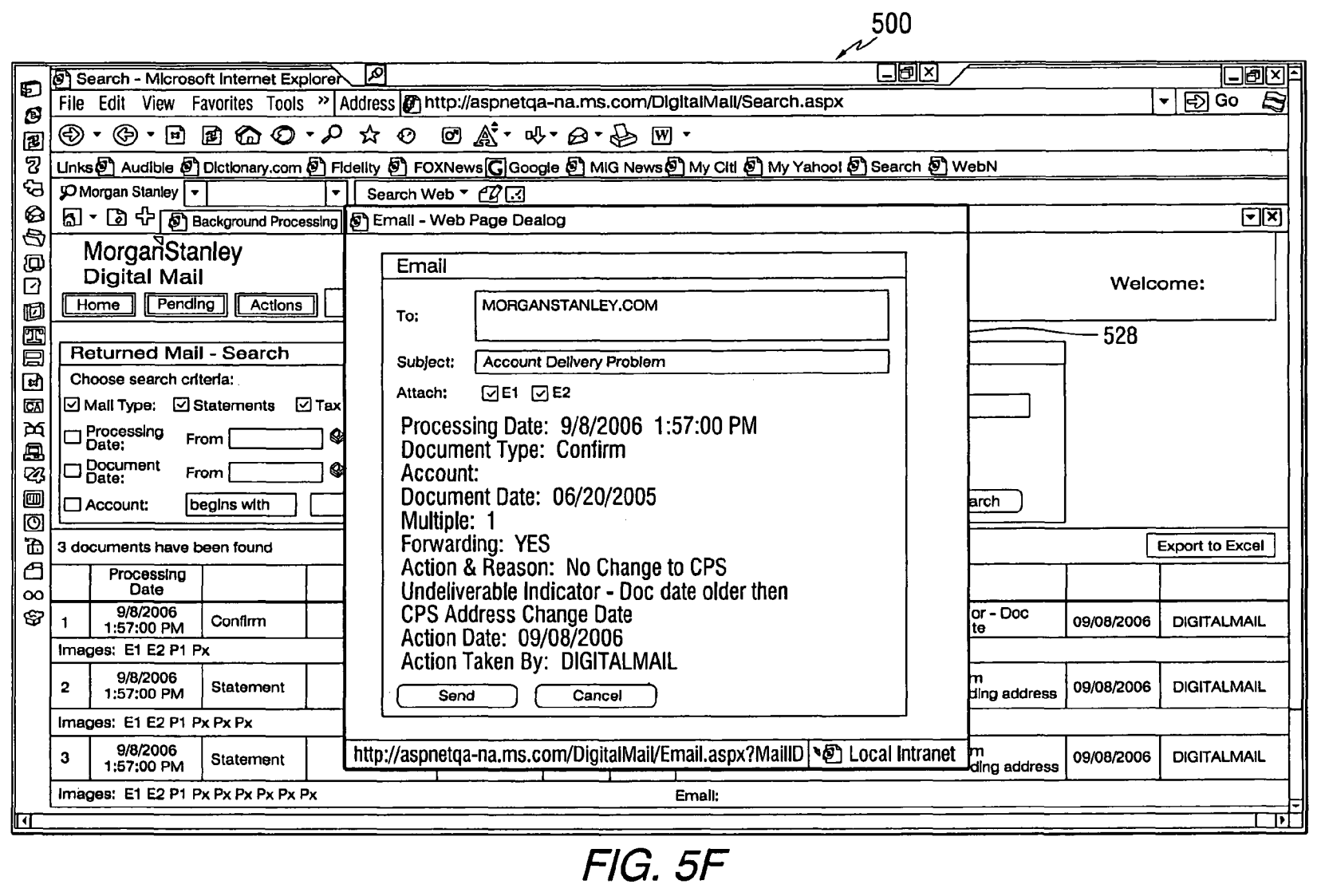

FIG. 5E shows a search window 526, according to various embodiments. The search window 526 may allow an operator to search the returned mail documents listed in field 506 according to various criteria including, for example, document type, processing date, document date, account number, etc. FIG. 5F shows an additional window for e-mailing or otherwise contacting a concerned individual regarding a client account whose undeliverable status has changed. The e-mail may be sent manually, or automatically upon a change in the state of a client's undeliverable indicator. The concerned individual may be any individual or computer system charged with responsibility for the client including, for example, the financial professional handling the client, an administrator, etc.

Figure 9:
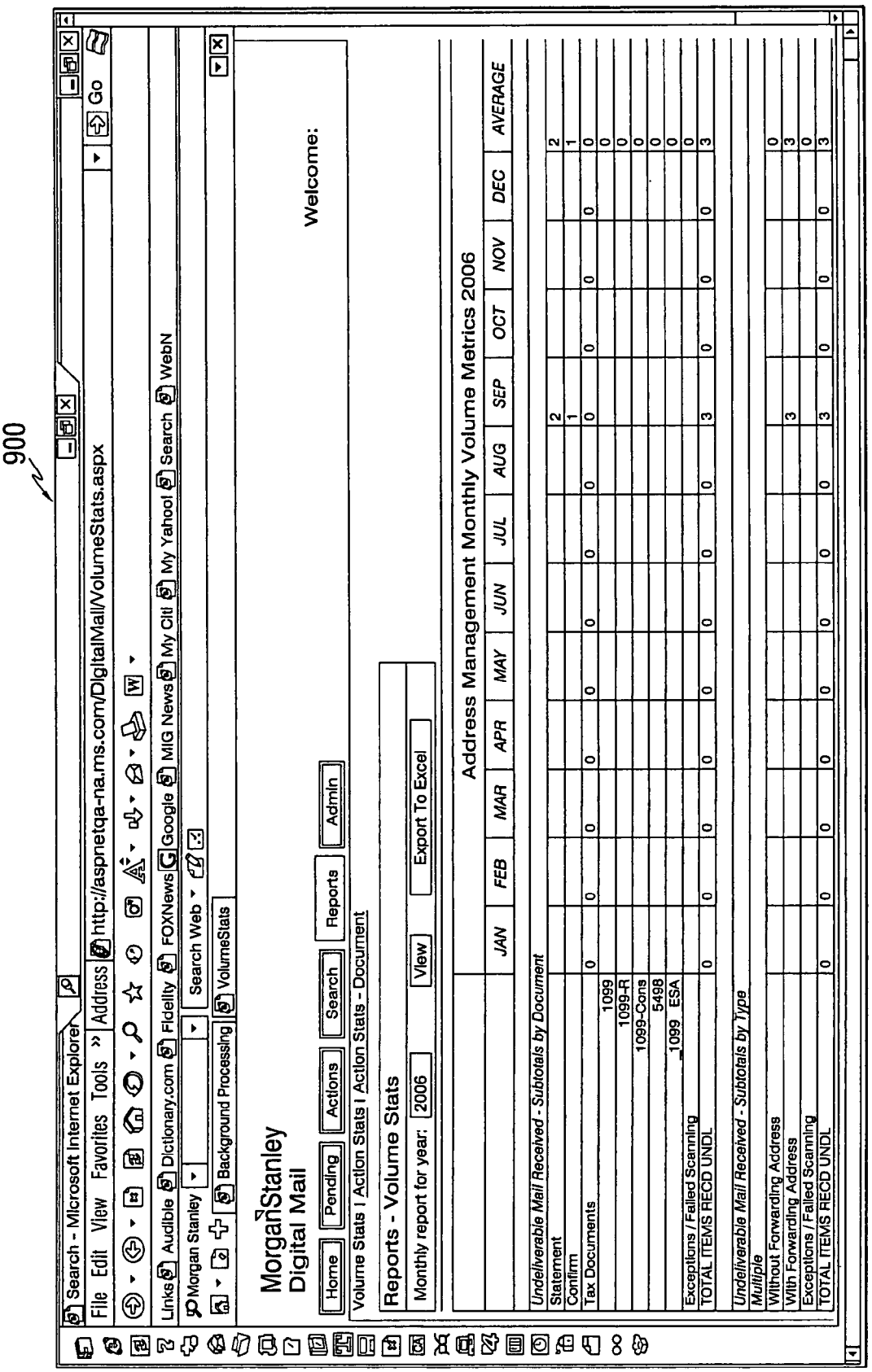
FIG. 9 illustrates a screen shot of a user interface according to various embodiments.

Various metrics regarding the performance of one or more of process flows 100, 200, 400, 600, 700 and/or 800 may be displayed, for example, in a user interface 900 shown in FIG. 9. The user interface 900 may display the number of returned mail documents by document type, time period, exceptions, etc.

Figure 10:
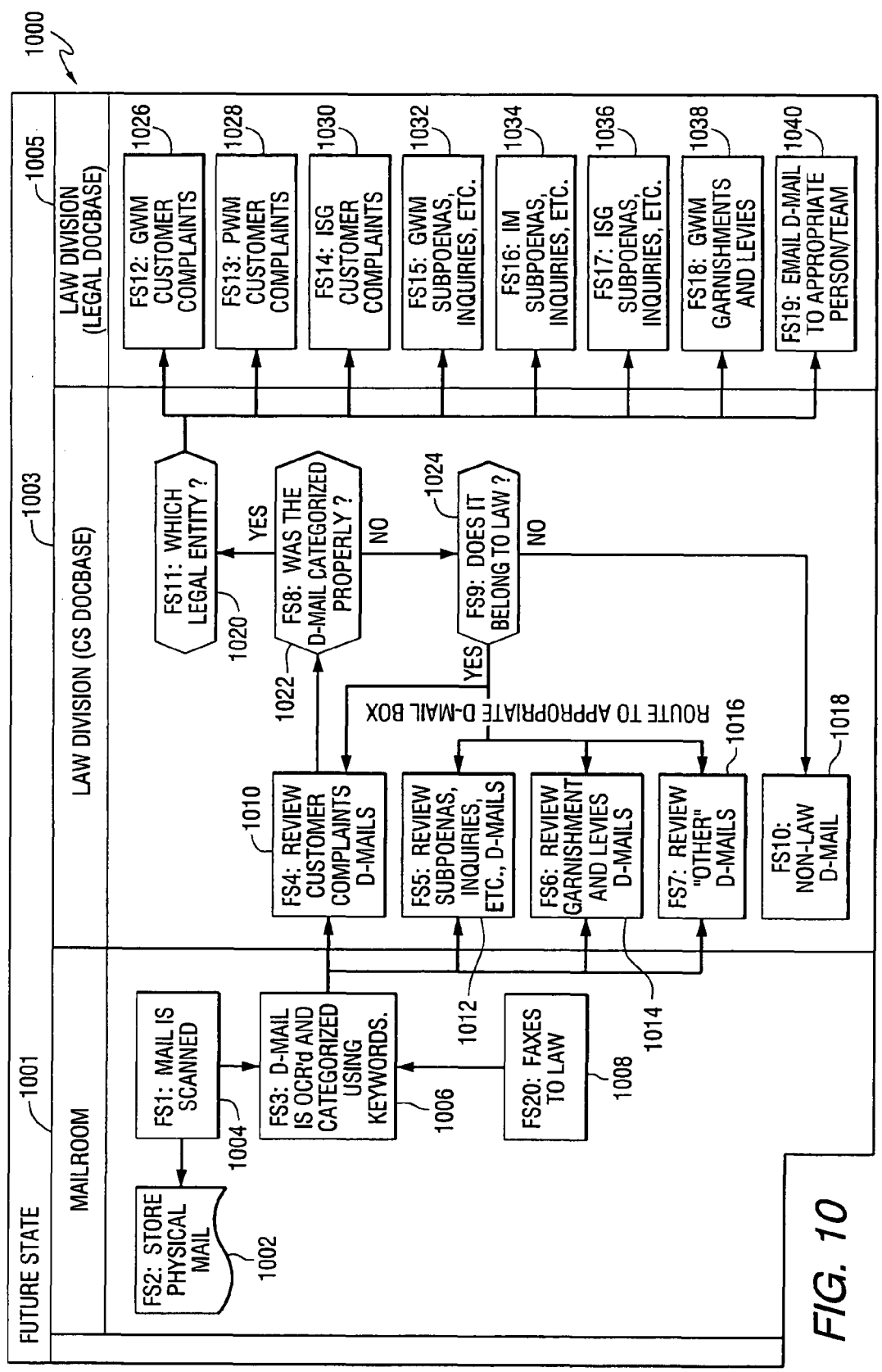
FIG. 10 illustrates a workflow diagram showing a process flow according to various embodiments.

In various embodiments, the methods and systems of the present disclosure may also be used to handle incoming legal documents. For example, FIG. 10 shows a workflow 1000 for handling legal documents that are received without a specific valid addressee (e.g., legal documents addressed to a firm, a division of a firm, an individual no longer employed by the firm, etc. The workflow 1000 indicates a party or parties who perform various steps and/or a location or locations where documents are stored. For example, the steps in column 1001 may be performed by a mailroom. Steps listed in column 1003 may be performed by a legal department or law division. Column 1005 indicates a legal department document database.

At step 1002, physical mail including legal documents may be stored. According to various embodiments, the physical mail may be stored only for a limited period of time (e.g., 30 days). At step 1004, legal documents included in the physical mail may be scanned. In various embodiments, this may involve scanning the envelope, and all pages of the legal documents. As shown at step 1008, it will be appreciated that legal documents may also be received by fax. Faxed legal documents may be printed and scanned. Also, in various embodiments, some legal documents (e.g., faxes, e-mails, e-mail attachments, etc.) may be received directly in electronic format, making scanning unnecessary.

At step 1006, the received legal documents may be subjected to OCR and categorized, for example, using a keyword search. Based on the categorization, the legal documents may be dropped in to various bins 1010, 1012, 1014, 1016 depending on document type. Each of the bins 1010, 1012, 1014, 1016 may correspond to a particular legal document type. The contents of the bins 1010, 1012, 1014, 1016 may be verified at step 1022. This step may be automated or, in various embodiments, one or more members of the legal department 1003 may have responsibility for doing so. If a particular legal document has been incorrectly categorized, then it may be determined whether it is actually a legal document at step 1024. If it is, then the document may be re-routed to the appropriate bin 1010, 1012, 1014, 1016. If it is not a legal document, then the document may be routed to a non-law bin 1018. If a particular legal document has been correctly classified, then it may be determined which legal entity or department that it pertains to at step 1020. The document may then be forwarded to one of bins 1026, 1028, 1030, 1032, 1034, 1036, 1038 and 1040 based on its legal document type, and the department or entity to which it pertains.

Figure 11:
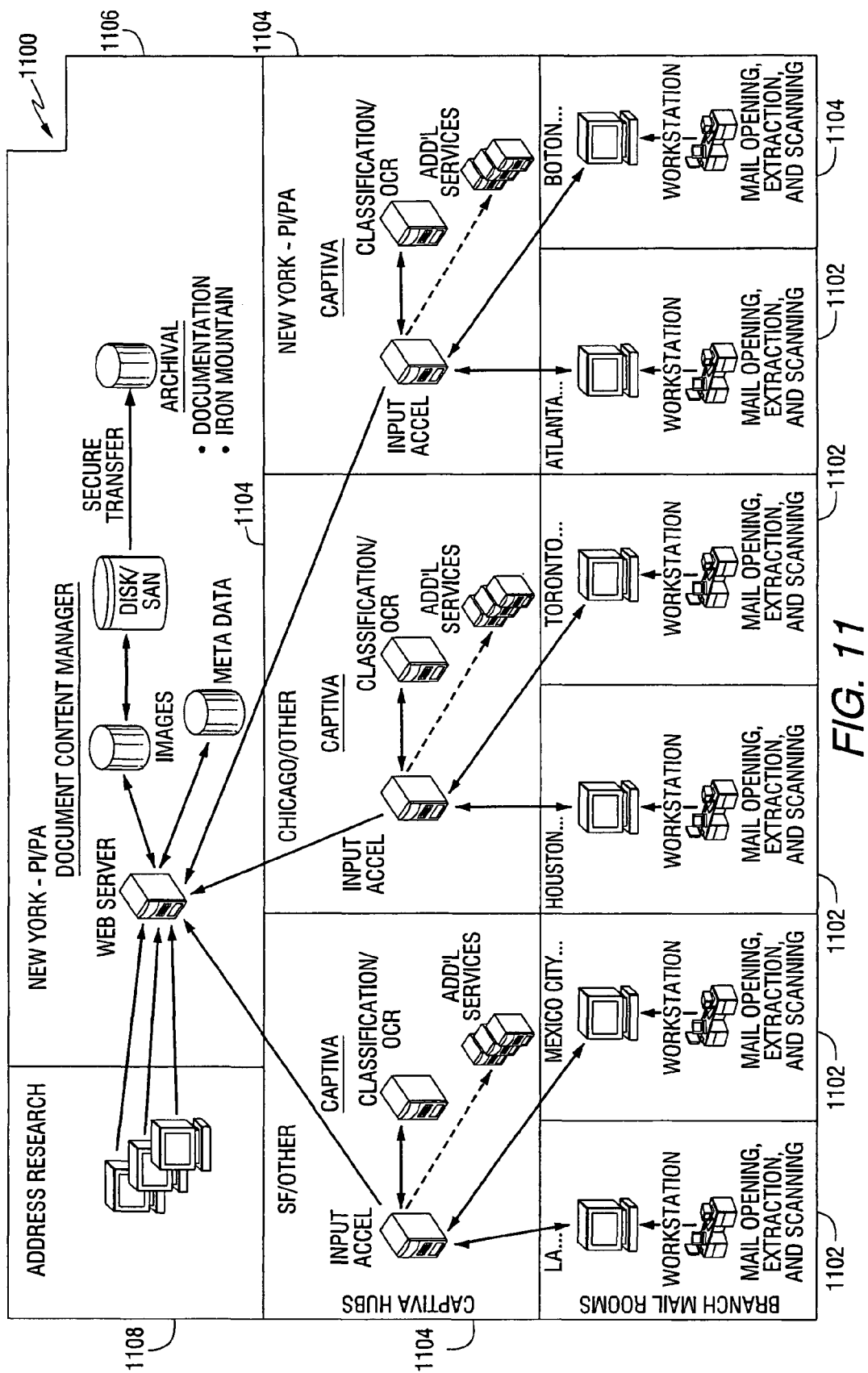
FIG. 11 illustrates a diagram of a system according to various embodiments.

It will be appreciated that the various processes described herein may be implemented at a single location, or may be implemented by a company having multiple locations. FIG. 11 shows a system 1100 for implementing the various processes across multiple branch locations. In the system 1100, branch mail rooms 1102 may include personnel and equipment for opening mail, performing initial pre-sorts, and scanning mail. In various embodiments, the branch mail rooms 1102 may include a workstation or workstations in contact with a server or other computer of a hub location 1104. The server may run a software package that facilitates scanning, OCR, and various other processing steps. The software package may be any suitable software package including, for example, CAPTIVA, and may be served to the workstations at the branch mail rooms 1102. As mail is scanned at the branch mail rooms 1102, the resulting images may be uploaded to the servers at the hub locations 1104. The servers may execute the software package to perform OCR and potentially classification and metadata extraction also. The software package may also allow other operations to be performed. For example, the format of scanned data may be modified.

The scanned images, metadata, classifications, transformations, etc. generated at the hub locations 1104 may be transmitted to one or more central content management centers 1106. There the data may be stored and archived, for example, using any suitable database or other storage mechanism. One or more software packages at the central content management centers may execute one or more of the process flows 100, 200, 400, 600, 700, 800 and/or 1000. In various embodiments, the hub locations 1104 may also forward exception information to the location(s) 1106. The exceptions may be handled by an address research team 1108 in contact with the location 1106. In various embodiments, the address research team 1108 may perform other various tasks including, for example, managing aspects of the process flows 100, 200, 400, 600, 700, 800 and/or 1000 as described above.

According to various embodiments, the step 222 of the workflow 200 may include a workflow for processing incoming client correspondence documents. For example, client correspondence documents may be one of the classifications of documents described above. Client correspondence documents may be documents received by a firm from its clients or customers. In some settings, for example, when the firm is a financial services firm, it may be advantageous to monitor client correspondence for evidence of client complaints or other indications of irregular activity that may suggest a remedy by the firm. Electronic versions of the client correspondence documents may be searched for indications of client complaints or other irregular activity. For example, in one embodiment, the text of each client correspondence document may be compared to a list of keywords indicating complaints or other irregular activity. If any client correspondence documents are identified as containing indications of complaints or other irregular activity, they may be aggregated and reported to appropriate personnel within the firm such as, for example, the legal department, a manager, etc.

According to various embodiments, the workflow implemented at step 222 may include a workflow for processing new account documents. New account documents may include requests for new client accounts as well as other documentation relating to new client accounts. For example, new account documents may be one of the classifications of documents described above. Once identified, new account documents may be forwarded to appropriate personnel.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A computer-implemented method of processing incoming documents received by a financial institution, the method comprising:
   scanning a first set of documents into electronic form;
   receiving, by a computer system, a plurality of documents in electronic form, wherein the plurality of documents comprises the first set of documents and a second set of documents received by the financial institution in electronic form, and wherein the computer system comprises at least one processor and operatively associated memory;
   classifying, by the computer system, each of the plurality of documents into at least one of a plurality of document classifications;
   extracting, by the computer system, metadata from the plurality of documents;
   executing, by the computer system, a first workflow for processing documents classified in a first document classification selected from the plurality of document classifications, wherein the first document classification describes incoming client correspondence documents received by the financial institution from clients of the financial institution, and where executing the first workflow comprises, for each document classified in the first document classification:
      determining whether the document comprises an indication of a customer complaint; and
      conditioned on whether the document comprises an indication of a customer complaint, forwarding the document to personnel for processing the complaint; and
   executing, by the computer system, a second workflow for processing documents classified in a second document classification selected from the plurality of document classifications, wherein the second document classification includes returned mail documents, and wherein executing the workflow comprises, for each document classified in the second document classification:
      correlating the document with a client account;
      conditioned upon a date of the document being before a most recent address change associated with the client account indicating that the document should be resent to the current address associated with the client account;
      conditioned upon the document having been returned more than once, storing an indication that the client account associated with the document is undeliverable;
      conditioned upon the document not having been returned more than once, storing an indication that the client account associated with the document is potentially undeliverable.

2. The method of claim 1, further comprising receiving the first set of documents in paper form.

3. The method of claim 1, wherein at least a portion of the scanning occurs at a first location, and further comprising transmitting electronic forms of the documents corresponding to the first portion of the scanning to a central location.

4. The method of claim 3, wherein the first and second workflows are executed at the central location.

5. The method of claim 1, further comprising performing optical character recognition (OCR) on at least one of the plurality of documents.

6. The method of claim 1, wherein scanning the first set of documents also comprises, for each of the first set of documents, scanning an envelope associated with the document, and wherein the classifying comprises considering the envelope.

7. The method of claim 1, further comprising applying an image enhancement algorithm to at least a portion of the plurality of documents.

8. The method of claim 1, wherein the classifying comprises considering at least one document attribute selected from the group consisting of shape, a bar code present on a document, a position of text on a document, and a position of symbols on a document.

9. The method of claim 1, further comprising:
   displaying at least one unclassified document to an operator;
   receiving from the operator an indication of at least one of the plurality of document classifications that corresponds to the document.

10. The method of claim 1, where the extracting metadata comprises extracting metadata from a first location on a first document selected from the plurality of documents and where the first location is determined considering a classification of the first document.

11. The method of claim 1, wherein the second document classification includes returned mail documents and wherein the second workflow is for processing returned mail.

12. The method of claim 1, wherein the second document classification includes legal documents, wherein the second workflow is for processing legal documents, and wherein executing the second workflow comprises, for each document classified in the second document classification:
   classifying the document as at least one of a subpoena, a garnishment and a levy;
   conditioned on the document be classified as a subpoena, transmitting the document to a location associated with subpoenas; and
   conditioned on the document being classified as at least one of a garnishment and a levy, transmitting the document to a location associated with garnishments and levies.

13. The method of claim 1, wherein the second workflow comprises:
   sorting the documents classified into the second document classification into types, wherein each type corresponds to a type of legal document; and
   assigning a first type to at least one member of a legal department for review.

14. The method of claim 1, wherein the second document classification includes documents including requests to open client accounts with a service provider.

15. A computer-implemented method of processing mail documents returned to a financial institution, the method comprising:
   receiving, by a computer system, a plurality of returned mail documents in electronic form, wherein the computer system comprises at least one processor and operatively associated memory;
   extracting, by the computer system, metadata from the returned mail documents;
   correlating, by the computer system, a returned mail document selected from the plurality of returned mail documents to a first client account considering the extracted metadata;
   if the returned mail document comprises a forwarding address:
      generating, by the computer system, instructions for re-sending the returned mail document to the forwarding address; and
      updating, by the computer system a status of the first client account to reflect the forwarding address;
   identifying a branch office of the financial institution associated with the first client account;
   transmitting, by the computer system, information about the returned mail document to the branch office;
   determining, by the computer system, whether the returned mail document was sent prior to the last address change associated with the first client account; and
   if the returned mail document was sent prior to the last address change associated with the first client account, generating instructions for resending the returned mail document to a new address associated with the first client account;
   determining, by the computer system, whether any other mail documents correlated to the first client account have been returned;
   updating, by the computer system, the number of returned mail documents correlated to the first client account considering the mail document;
   conditioned upon the number of returned mail documents correlated to the first client account being greater than or equal to a predetermined number, marking the first client account undeliverable;
   conditioned upon the number of returned mail documents correlated to the first client account having been greater than or equal to a second predetermined number for greater than a predetermined time period, marking the first client account undeliverable, wherein the second predetermined number is less than the first predetermined number.

16. The method of claim 15, further comprising, if the returned mail document includes a forwarding address:
   updating an indicator associated with the first client account to indicate that the existing address associated with the first client account is undeliverable;
   generating instructions for resending the first returned mail to the forwarding address.

17. The method of claim 15, further comprising determining whether the first client account is open.

18. The method of claim 15, further comprising:
   receiving the plurality of mail documents in paper form;
   scanning the plurality of mail documents to electronic form; and
   storing the paper form documents for a predetermined amount of time.

19. The method of claim 15, wherein the correlating comprises searching the metadata from the returned documents for an indication of the first client account.

20. The method of claim 15, wherein the metadata comprises indications of at least one datum selected from the group consisting of an addressee, a mailing address, a forwarding address, a type of document; a corresponding client account.

21. The method of claim 15, further comprising displaying the returned mail document to a user when the correlating fails.

* * * * *